United States Patent
Prestayko

[11] 3,977,726
[45] Aug. 31, 1976

[54] DOUBLE HITCH TILTABLE TRAILER

[76] Inventor: Metro Prestayko, General Delivery, Valley River, Manitoba, Canada

[22] Filed: Jan. 20, 1975

[21] Appl. No.: 542,490

[52] U.S. Cl. .................................. 298/5; 298/21 V
[51] Int. Cl.² ........................................ B60P 1/04
[58] Field of Search ................ 298/21 V, 20 R, 5 R

[56] References Cited
UNITED STATES PATENTS

| | | | |
|---|---|---|---|
| 1,894,320 | 1/1933 | Muchenberger | 298/5 |
| 2,131,326 | 9/1938 | Kaster | 298/20 R |
| 2,628,126 | 2/1953 | Black | 298/5 |
| 2,867,474 | 1/1959 | Linn | 298/5 R |

Primary Examiner—Philip Goodman
Attorney, Agent, or Firm—Stanley G. Ade

[57] ABSTRACT

A hitch extends between a towing vehicle such as a tractor, and a trailer includes an upper hitch and a lower hitch together with a releasable latch means holding one against the other. When released, back up of the towing vehicle and, if necessary, applying the brakes of the trailer, tilts the trailer rearwardly and continued backing up tilts the trailer over through nearly 180° for full dumping. When the towing vehicle is moved forwardly the trailer returns to the towing position and the latch means may be re-engaged between the upper and lower hitches.

12 Claims, 14 Drawing Figures

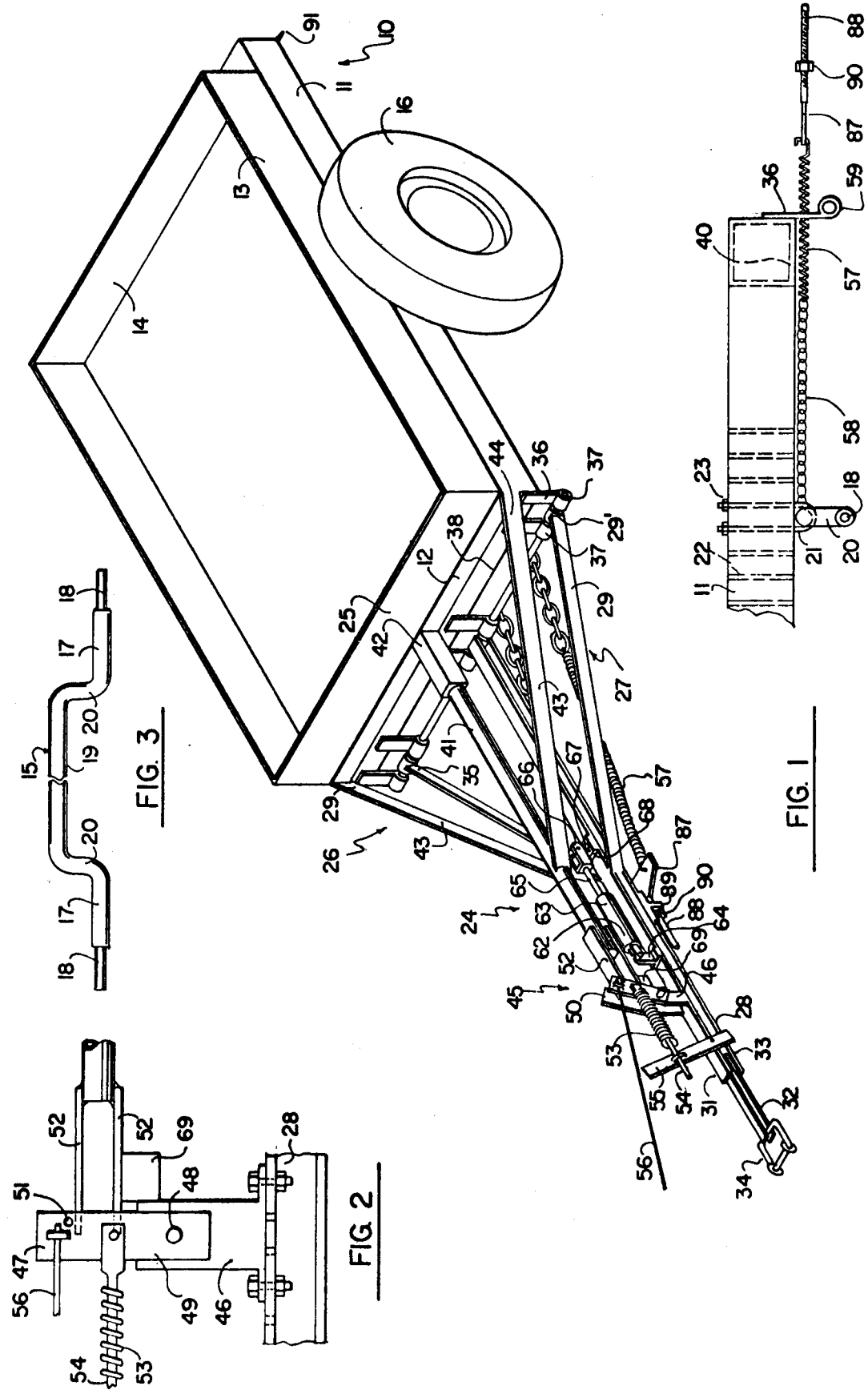

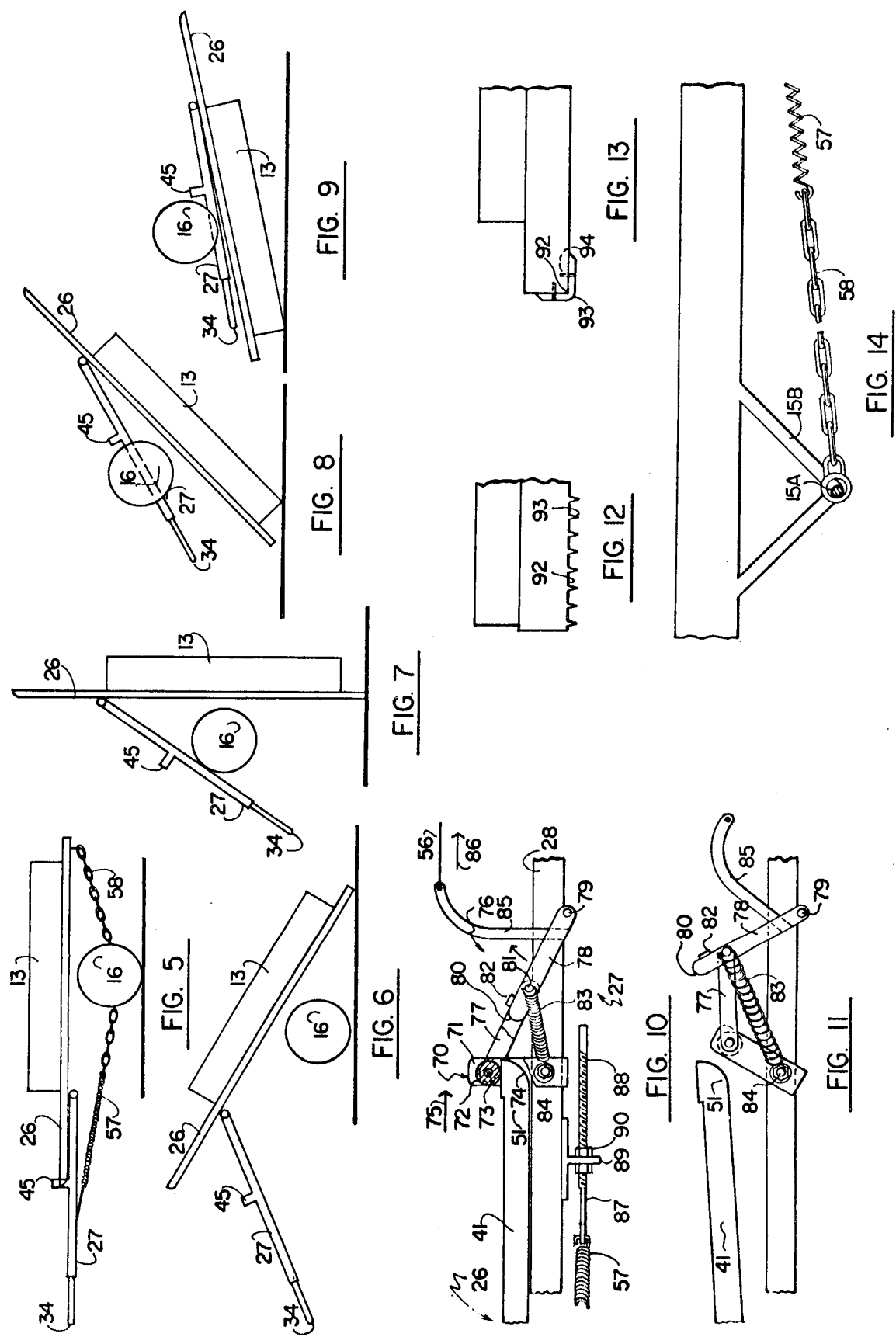

DOUBLE HITCH TILTABLE TRAILER

BACKGROUND OF THE INVENTION

This invention relates to new and useful improvements in trailers or the like normally used in farm or other areas where it is desirable to dump the load rather than unload it by hand or mechanically and constitutes a continuation-in-part application of Ser. No. 325,557, filed Jan. 22, 1973 (now abandoned). Examples which should not be construed as being restrictive include bales, stones, rocks, soil, manure and the like.

Normally trailers which have a dumping action include a main frame and a trailer body which is tiltable either by means of hydraulic or winch action in order that the load may be dumped. These necessarily are relatively expensive because of the construction thereof and also require a complete hydraulic system normally operated by the towing vehicle such as a tractor. Alternatively, if a winch system is provided then this must be manually operated.

SUMMARY OF THE INVENTION

The present invention overcomes these disadvantages by providing a relatively simple trailer which can be towed in the normal manner. When it is desired to dump the trailer, a latch is released between upper and lower hitches and the towing vehicle is backed up. This causes the trailer to tilt and further backing up will permit the trailer to be tilted rearwardly through almost 180° thus ensuring complete dumping particularly of such materials as manure and the like. The towing vehicle may then be moved forwardly which returns the trailer to the towing position.

The principal object and essence of the invention is therefore to provide a device of the character herewithin described which includes a lower pivotal hitch assembly normally attached to the towing vehicle and an upper hitch assembly normally held by releaseable latch means to the lower hitch assembly so that the trailer is in the towing position.

Another object of the device is to provide a device of the character herewithin described in which the trailer may be dumped by releasing the latch assembly and backing up the towing means. Under normal circumstances the balance of the device will cause the trailer to pivot around the wheels so that the back end of the trailer engages the ground whereupon further backing up of the towing vehicle will tilt the trailer through approximately 180°. Alternatively, brakes may be provided on the trailer which may be applied to assist in the initial tilting action.

A still further object of the invention is to provide a device of the character herewithin described which is adapted to be used with different sizes of trailers and which furthermore is fully adjustable so that it may be suitably engaged with a towing vehicle available.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

FIG. 1 is an isometric view of the trailer and hitch assembly of one embodiment with the trailer in the towing position.

FIG. 2 is an enlarged side elevation of one embodiment of the latch assembly per se.

FIG. 3 is a front elevation of one embodiment of the axle per se.

FIG. 4 is a fragmentary side elevation of one longitudinal side member of the chassis showing means to adjust the position of the axle therealong.

FIGS. 5 to 9 inclusive are schematic side elevations showing the trailer being moved from the towing position to the fully tilted position.

FIG. 10 is a fragmentary side elevation of the preferred latch assembly in the latched position.

FIG. 11 is a view similar to FIG. 10 with the latch assembly in the unlatched position.

FIG. 12 shows a fragmentary rear corner of the trailer.

FIG. 13 shows a fragmentary rear side of the trailer.

FIG. 14 is a view similar to FIG. 4 but showing the preferred axle mounting construction.

In the drawings like characters of reference indicate corresponding parts in the different figures.

DETAILED DESCRIPTION

Proceeding therefore to describe the invention in detail, reference character 10 illustrates a substantially rectangular trailer frame including longitudinal members 11, and front member 12. A transverse rear member (not illustrated) is similar to the member 12 and forms together with the two spaced and parallel longitudinal members 11, a substantially rectangular frame or chassis.

Load carrying means taking the form of an open topped box 13 may be supported upon the chassis or frame 10 in the usual way and the rear wall 14 may either be capable of being opened or not as the case may be.

A transverse axle 15 is secured to the chassis 11 and a ground engaging wheel 16 is journalled for rotation upon each end of the axle.

FIG. 3 shows one embodiment of the axle although such axle may be formed from a straight bar. In this embodiment, the stub ends 17 carry the normal stub shafts 18 upon which the wheels 16 may be journalled in the usual manner. The main portion 19 of the axle is stepped upwardly from the ends 17 by means of the stepped portions 20 thus giving clearance for the full tilting operation as will hereinafter be described.

It is desirable to provide adjustable means for mounting the axle along the length of the chassis 10 and details of this are shown in FIG. 4. One method of securing the axle consists of U bolts 21 which extend around the axle with the legs of the U bolts extending through any pair of a plurality of apertures 22 formed in the longitudinal members 11. These U bolts engage around the main portion 19 of the axle and clamp same to the underside of the longitudinal members, nuts 23 securing the U bolts as clearly shown.

If desired, conventional brakes (not illustrated) may be supplied to the wheels 16 and operated electrically from the towing vehicle in the conventional manner and of course, if used on the highway, the necessary lighting will be provided (also not illustrated) connected to the towing vehicle's system. Said lighting should of course include stop lights operable when the brakes are applied.

FIG. 14 shows the preferred axle construction in which a straight axle 15A is supported below the chassis by two pairs of diagonal members 15B one pair only being shown in FIG. 14.

A hitch assembly collectively designated 24 extends from the front end 25 of the trailer and is connectable to a towing vehicle (not illustrated) which, on the farm, will generally take the from of a tractor.

The hitch assembly 24 includes an upper hitch assembly generally designated 26 and a lower hitch assembly generally designated 27.

The lower hitch assembly includes a main beam 28 and a pair of diverging brace members 29 which are secured by the front ends thereof intermediate the ends of the main beam and diverge one upon each side of the rear end 30 of the main beam.

The main beam 28 is preferably adjustable in length by means of a hollow end 31 into which is engaged the front end 32 of the main beam, being bolted in any one of a plurality of selected positions by means of bolts 33. A hitch clevis 34 is secured to the front of the front end 32 for attachment to the towing vehicle in the usual way.

The distal ends 35 of the brace members 29 and the rear end 30 of the main beam are pivotally connected to the chassis 11 by means of a plurality of brackets 36 and bearing sleeves 37 together with a transverse pivot rod 38 extending through the bearing sleeves 37 which are formed on the lower ends of brackets 36. The ends of the brace members 29 are also provided with bearing sleeves 29' which engage between adjacent bearing sleeves 37 and the end 30 of the main beam is also provided with a bearing sleeve 39 engaging between the bearing sleeves 37 of the pair of brackets provided centrally.

In FIG. 1, these brackets are shown as being secured to the front transverse member 12 of the chassis and these brackets are adjustable vertically within limits in a conventional manner.

Alternatively, if the trailer is relatively long, then these brackets 36 may be supported from a cross member 40 extending between the longitudinal members 11. The brackets 36 under these circumstances should be forwardly of the axle 15 and one such position is shown in FIG. 4.

In any event the lower hitch assembly 27 is pivotally secured to the chassis 10 forwardly of the axle, said pivotal attachment being transversely of the trailer as clearly illustrated.

The upper hitch assembly 26 includes a main member 41 secured by the rear end 42 thereof to the transverse front chassis member 12. A pair of diverging members 43 extend from intermediate the ends of the main member 41 and are secured by the distal ends 44 thereof to the transverse front member 12 of the chassis 10 adjacent the outer corners thereof as clearly illustrated.

This upper hitch assembly is above the lower hitch assembly when the trailer is in the towing position as illustrated in FIG. 1.

Means are provided to maintain the trailer in the towing position until it is desired to dump the load contained therein, said means taking the form of a latch assembly collectively designated 45 and one embodiment is shown in FIGS. 1 and 2.

A support bracket 46 extends upwardly from the main beam 28 of the lower hitch assembly and a clevis 47 is pivotally secured to this bracket upon pivot pin 48. This clevis consists of a pair of spaced and parallel side plates 49 and a top member 50 spanning the upper ends thereof.

Means are provided extending from the clevis to detachably engage the front end 51 of the main member 41 of the upper hitch assembly 26, said means taking the form of a pair of spaced and parallel plates 52 secured to and extending forwardly from the main member 41. The distal end of the upper plate engages below a cross member or bolt 51 spanning the clevis 47 when in the towing position as shown in FIGS. 1 and 2 and the clevis is normally maintained in the engaged position by means of a compression spring 53 extending around a sliding rod 54 and reacting between the clevis 47 and a support bracket 55 extending upwardly from the main beam 28. This bracket 55 is adjustable along the length of the main beam so that the position of the clevis can be adjusted within limits. The clevis is adjustable along the main beam 28, and also the length of main member 41 as shown.

Cable means 56 extend from the clevis adjacent the upper end of plates 49 forwardly to the towing vehicle so that it can be operated by the operator when it is desired to tilt the trailer.

In operation, the trailer may be towed in the towing position shown in FIG. 1 under which circumstances spring 53 maintains the clevis in the engaged position with the plate 52.

When it is desired to dump the load carried by the trailer, the towing vehicle is stopped and, if brakes are provided upon wheels 16, they are applied. The cable 56 is then pulled moving the clevis forwardly against pressure of spring 53. This disengages the pin 51 from the distal end of plate 52 and permits the main member 41 together with the trailer to tilt upwardly, said trailer moving around the axle ends 18.

The trailer is then moved rearwardly and as the wheels 16 are held by the brake, the trailer will tip to the position shwon in FIG. 6, FIG. 5 illustrating the trailer in the towing position.

The pivotal action of the lower hitch to the trailer frame will permit the trailer to take up the position shown in FIG. 6 and further rearward movement of the towing vehicle will cause the trailer to tip upwardly upon the rear end thereof as shown in FIG. 7. Further rearward action of the towing vehicle will move the trailer to the position shown in FIG. 8 and finally to the position shown in FIG. 9 under which circumstances the stepped up portion of the axle 19 permits the main beam 28 sufficient clearance to permit this final dumping position to be reached. It will be seen that the trailer can be tilted to nearly 180° if it is necessary in order to dump the load carried thereby. It will also be noted that the wheels 16 leave the ground completely during the tipping action. If the trailer is balanced correctly with the majority of the load at the rear thereof, it is not necessary to utilize wheels 16 with brakes because as soon as the rearward movement of the towing vehicle takes place after the latch assembly has been released, the trailer will commence to tip until the rear end thereof engages the ground.

Once the load has been dumped, the towing vehicle moves forwardly moving the trailer through the positions shown from FIGS. 9, 8, 7, 6 back to FIG. 5. In order to prevent shock loads occurring as the trailer returns to the towing position, a shock absorbing system is included. This includes a spring 57 secured by one end thereof to the underside of the main beam 28 with a chain 58 being secured to the other end of the spring. This chain extends rearwardly and is connected by the other end thereof either to the axle as shown in FIGS. 4 and 14 or to adjacent the rear of the chassis passing under the axle as shown in FIG. 5. In either case the tension of the spring shock absorber may be adjusted as will hereinafter be described.

Under certain circumstances of load, depending upon conditions and also depending upon the length of the trailer, it may be necessary to provide means to initiate the tilting action beyond that which is provided by the release of the assembly 45.

Reference to FIG. 1 will show a fluid operator 62 which includes a cylinder 63 pivotally mounted to the frame by means of support brackets 64. A piston rod 65 extends from this cylinder and a clevis 66 on the end of this piston rod, is pivotally secured to a curved member 67 which is also pivoted to the lower frame as shown at 68.

The upper end of this curved member engages under the upper frame member 41 so that if the piston and cylinder assembly is extended, the curved member 67 moves the upper hitch assembly upwardly thus initiating the tilting action.

Means are provided to support the trailer against downward tilting action when in the towing position and when relatively fully loaded. Under these circumstances there is considerable strain on the latch assembly 45 which may tend to sag.

I have therefore provided a block 69 (see FIG. 2) secured rearwardly of the brackets 46 and engaging under the lower plate 52 thus giving support at this point. The two plates 52 can be used as a hitch clevis if the trailer is used with just the upper hitch assembly installed.

The preferred latch assembly is shown in FIGS. 10 and 11 which includes a clevis collectively designated 70 comprising a pair of plates 71 pivoted one upon each side of the lower hitch beam 28 and extending upwardly therefrom.

A roller 72 is journalled for rotation between the upper ends of these plates, upon a pin 73 and it will be noted that the front end 51 of the member 41 is provided with a curved undersurface 74 so that as the member 41 moves downwardly in the direction of arrow 75 (see FIG. 11) this curved undersurface will strike the roller and move the clevis rearwardly in the direction of arrow 75 so that the front end 51 passes the roller which then returns to the vertical position shown in FIG. 10 engaging upon the upper surface of the front end 51 thus locking the upper hitch into position as shown.

Over center linkage collectively designated 76 extends between the clevis and the frame and includes the upper pair of links 77 pivoted by one end thereof to shaft 73.

A lower pair of links 78 are pivoted by one end thereof to the member 28 by means of pivot 79 and the other ends of the upper links 77 are pivoted to the lower links 78 spaced from the upper ends 80 thereof, by means of pivot pin 81.

A cross bar 82 spans the other ends 80 and engages the upper sides of the upper links 77 when in the locked or over center position shown in FIG. 10 and a pair of tension springs 83 extend between the clevis pivot pin 84 and the pivot pin 81 and normally pull the links 77 and 78 to the over center position shown in FIG. 10.

The aforementioned operating cable 56 extends from a member 85 extending upwardly from one of the lower links 78.

The springs 83 normally retain the trailer in the towed position with the upper hitch assembly locked against the lower hitch assembly as shown in FIG. 10.

However, when it is desired to dump, the cable 56 is moved in the direction of arrow 86 thus braking the over center linkage 76 and moving the clevis rearwardly thus extending springs 83 so that the assembly takes up the position shown in FIG. 11.

This releases the upper hitch assembly whereupon cable 56 can be released thus returning the clevis 70 to the position shown in FIG. 10. Inasmuch as the upper ends of the clevis are open, when the upper hitch member 41 moves downwardly in the direction of arrow 75, latching is automatic as hereinbefore described.

Means are provided to initiate the tilting action of the trailer a particular requirement if the load happens to be forwardly of the axle of the trailer.

In this regard reference should be made to the shock absorber assembly mentioned previously.

In the preferred embodiment, this assembly includes a cross bracket 87 having a centrally located forwardly extending screw threaded bolt 88 engaging through a bracket 89 depending below the member 28 of the lower hitch assembly. Nuts 90 adjust the relationship of the this bolt 88 relative to the bracket 89.

A pair of springs 57 are provided one upon each side of the cross bracket 87 and a pair of chains 58 are secured by one end thereof one to each of the springs 57 and extend rearwardly as hereinbefore described. By adjusting the tension of springs 57 by means of the bolt 88 and nuts 90, the trailer is forced to tilt slightly as soon as the latch assembly is released so that the member 41 of the upper hitch assembly takes up the position shown in FIG. 11 pulled by the pretensioned springs 57.

By the same token, the tension of these springs 57 causes the shock absorber to absorb the downward movement of the trailer when it is returned to the towing position.

Finally reference should be made to FIGS. 1, 12 and 13 in which means are provided to enable the rear side of the trailer to engage the ground during the tipping action illustrated in FIGS. 6 through 9 and to prevent the trailer from skidding on icy or smooth surfaces.

Two embodiments are provided, firstly a plurality of spikes 91 are secured across the lowermost corner 92 of the chassis frame and engage the ground surface during the tilting action.

The other embodiment is shown in FIG. 13 which includes a strip of rubber or the like 93 secured around this corner 92 by means of fasteners 94. This may take the form of sections of tire casing or rubber webbed belting or the like.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim to be invention is:

1. A tiltable trailer and hitch movable from a towing position to a tilted position and vice versa and adapted to be connected to a towing vehicle; comprising in combination a trailer frame, load carrying means on said frame, a transverse axle secured to said frame, ground engaging wheels journalled for rotation one on each end of said axle, a lower hitch assembly extending from said trailer frame forwardly of said axle, an upper hitch assembly extending from one end of said trailer above said lower hitch assembly, said lower hitch assembly connecting with said towing vehicle by one end thereof, and being pivotally secured transversely to said trailer forwardly of said axle, and releaseable latch means between said upper and said lower hitch assemblies normally maintaining said trailer in the towing position but releasing said trailer for rearward tilting action whereby said trailer may be moved to the tilted position, means to release and secure said latch means, said latch means including a clevis pivotally supported on said lower hitch assembly, over center means normally urging said clevis rearwardly towards said trailer and extendable and retractable spring loaded, means connected by one end thereof to said lower hitch assembly and by the other end thereof to said frame to firstly initiate the tilting of said trailer frame when said latch means is released and secondly to cushion the return movement of said trailer frame to the towing position.

2. The device according to claim 1 in which said lower hitch assembly includes a main beam and a pair of diverging braces extending rearwardly from along the length of said main beam, said main beam and the distal ends of said braces being pivotally secured to said trailer as aforesaid.

3. The device according to claim 1 in which said upper hitch assembly includes a main member and a pair of diverging members extending rearwardly from along the length of said main member, said main member and the distal ends of said diversion members being secured to said one end of said trailer.

4. The device according to claim 2 in which said upper hitch assembly includes a main member and a pair of diverging members extending rearwardly from along the length of said main member, said main member and the distal ends of said diversion members being secured to said one end of said trailer.

5. The device according to claim 1 in which said over center means includes an upper link pivotally secured by one end thereof to adjacent the upper end of said clevis, a lower link pivotally secured by one end thereof to said lower hitch assembly, said upper link being secured by the other end thereof to adjacent the other end of said lower link, locking means spanning the other end of said lower link and engaging said upper link when in the over center position and spring means extending between said over center means and said lower hitch assembly normally urging said links to said over center postion.

6. The device according to claim 2 in which said over center means includes an upper link pivotally secured by one end thereof to adjacent the upper end of said clevis, a lower link pivotally secured by one end thereof to said lower hitch assembly, said upper link being secured by the other end thereof to adjacent the other end of said lower link, locking means spanning the other end of said lower link and engaging said upper link when in the over center position and spring means extending between said over center means and said lower hitch assembly normally urging said links to said over center position.

7. The device according to claim 3 in which said over center means includes an upper link pivotally secured by one end thereof to adjacent the upper end of said clevis, a lower link pivotally secured by one end thereof to said lower hitch assembly, said upper link being secured by the other end thereof to adjacent the other end of said lower link, locking means spanning the other end of said lower link and engaging said upper link when in the over center position and spring means extending between said over center means and said lower hitch assembly normally urging said links to said over center postion.

8. The device according to claim 4 in which said over center means includes an upper link pivotally secured by one end thereof to adjacent the upper end of said clevis, a lower link pivotally secured by one end thereof to said lower hitch assembly, said upper link being secured by the other end thereof to adjacent the other end of said lower link, locking means spanning the other end of said lower link and engaging said upper link when in the over center position and spring means extending between said over center means and said lower hitch assembly normally urging said links to said over center position.

9. The device according to claim 5 which includes roller means journalled within said clevis, the front end of said upper hitch assembly engaging under said roller means when said trailer is in the towing position, and means on said front end engageable upon said roller when said front end moves from the tilted position to the towing position, to urge said latch means to the released position against pressure of said spring means.

10. The device according to claim 6 which includes roller means journalled within said clevis, the front end of said upper hitch assembly engaging under said roller means when said trailer is in the towing position, and means on said front end engageable upon said roller when said front end moves from the tilted position to the towing position, to urge said latch means to the released position against pressure of said spring means.

11. The device according to claim 7 which includes roller means journalled within said clevis, the front end of said upper hitch assembly engaging under said roller means when said trailer is in the towing position, and means on said front end engageable upon said roller when said front end moves from the tilted position to the towing position, to urge said latch means to the released position against pressure of said spring means.

12. The device according to claim 8 which includes roller means journalled within said clevis, the front end of said upper hitch assembly engaging under said roller means when said trailer is in the towing position, and means on said front end engageable upon said roller when said front end moves from the tilted position to the towing position, to urge said latch means to the released position against pressure of said spring means.

* * * * *